United States Patent [19]

Welch

[11] Patent Number: 5,421,290

[45] Date of Patent: Jun. 6, 1995

[54] ANIMAL FEEDER

[76] Inventor: Wilmer M. Welch, 211 Alta Vista, Del Rio, Tex. 78840

[21] Appl. No.: 221,100

[22] Filed: Mar. 31, 1994

[51] Int. Cl.⁶ ............................................. A01K 5/02
[52] U.S. Cl. ............................ 119/51.11; 119/57.91; 119/61
[58] Field of Search ................. 119/61, 51.01, 51.11, 119/51.12, 58, 57.1, 52.1, 57.91

[56] References Cited

U.S. PATENT DOCUMENTS

| | | | |
|---|---|---|---|
| 735,167 | 8/1903 | Steinberg | 119/51.11 |
| 890,352 | 6/1908 | Fredrick | 119/51.11 |
| 3,195,508 | 7/1965 | Lehman et al. | 119/51.11 |
| 3,628,505 | 12/1971 | Myers | 119/61 |
| 4,235,200 | 11/1980 | Shay | 119/51.11 |
| 4,756,277 | 7/1988 | Peng | 119/51.11 |
| 4,945,859 | 8/1990 | Churchwell | 119/57.91 |
| 5,199,381 | 4/1993 | Masopust | 119/51.11 |
| 5,303,672 | 4/1994 | Morris | 119/51.11 |

*Primary Examiner*—Paul J. Hirsch
*Attorney, Agent, or Firm*—Donald R. Comuzzi; Christopher L. Makay

[57] ABSTRACT

An animal feeder includes a hopper suspended from a frame using a winch. The frame includes an A-shaped support member connected to a pair of feet. The hopper includes a drum having a removable lid and a bottom. The bottom of the drum includes an outlet which permits the dispensing of feed. Legs are connected to the bottom portion of the drum to support it on the ground and prevent the outlet from clogging. A solenoid operated gate controlled by an interval timer regulates the flow of feed from the hopper to produce periodic feedings. A brace connects to the upper portion of the drum to permit the suspension of the drum from the frame by the winch. The winch operates to lower the hopper to permit its easy filling with feed and to raise the hopper after it has been filled to suspend it from the frame. A chain connected between the hook and the bottom portion of the drum elevates the bottom portion of the drum to provide the hopper with an angled orientation with respect to ground.

9 Claims, 1 Drawing Sheet

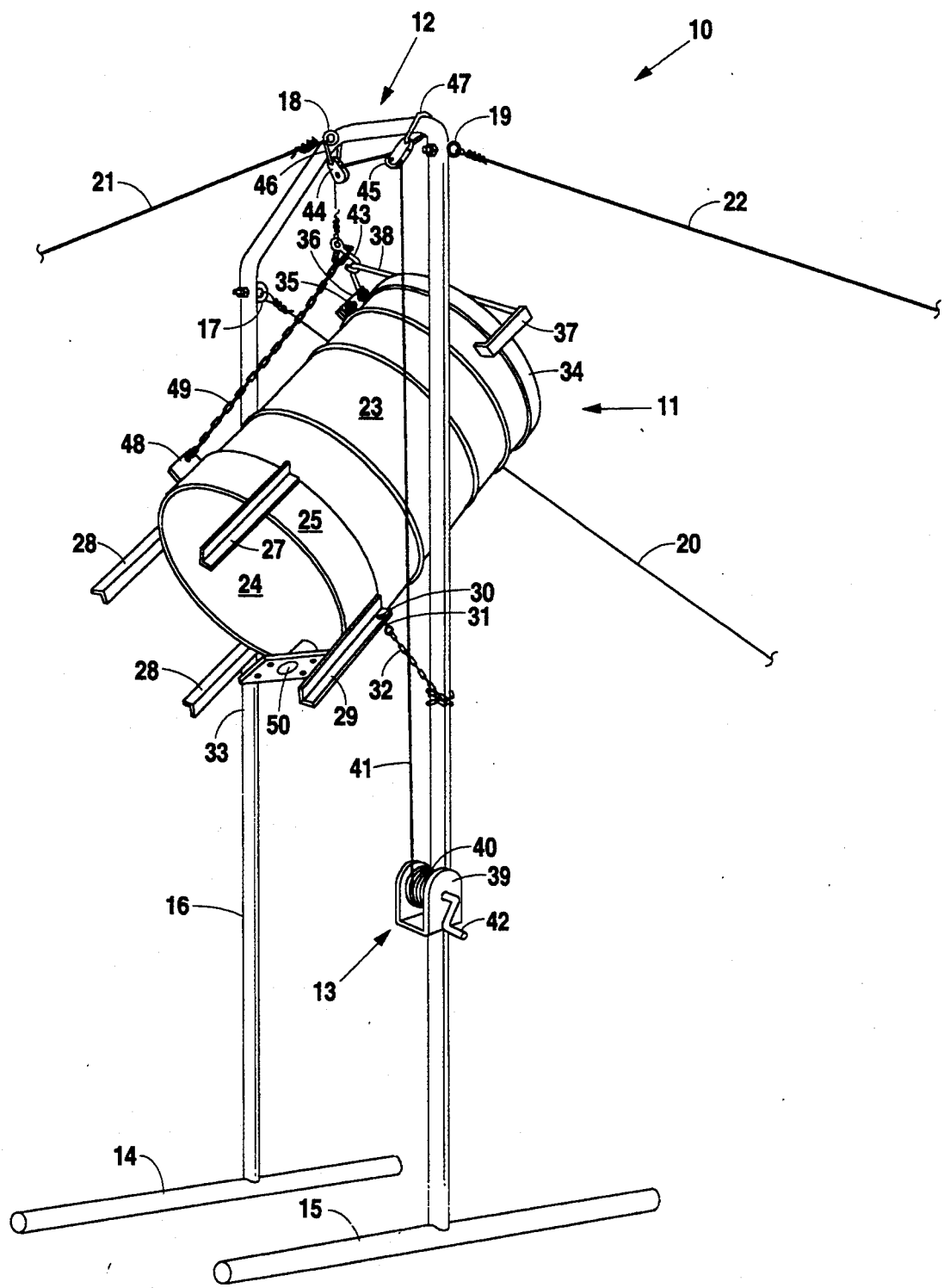

ANIMAL FEEDER

BACKGROUND OF THE INVENTION

1. Field of the Invention

The present invention relates to animal feeders and, more particularly, but not by way of limitation, to an animal feeder with an improved suspension system for its hopper.

2. Description of the Related Art

Animal feeders currently in use include a feed hopper suspended from a frame. The frame consists of a tripod formed by three poles connected together at one of their ends. The hopper is typically cylindrically shaped with its top end including an inlet for animal feed and its bottom end including an outlet for the feed. The hopper contains a funnel positioned in its lower portion to direct the feed towards the outlet.

Additionally, the hopper includes a solenoid operated gate fitted over the outlet from its bottom to control the flow of feed from the hopper. A timer controls the solenoid to open the gate at the expiration of specified time intervals to produce periodic release of the feed.

The upper portion of the hopper is fitted with brackets which receive a chain utilized to suspend the hopper in a vertical plane from the frame. Thus, after the frame is assembled, the hopper must be manually lifted so that the chains may be attached to the frame. Once the hopper has been suspended from the frame, it must be filled by a person that has carried a feed bag up a ladder.

Accordingly, typical animal feeders are difficult to use and present a physical hazard. First, the suspension of the hopper requires its manual lifting to a position sufficiently high off the ground to allow its connection to the frame. That often requires several people with one person standing on a ladder. Second, after the suspension of the hopper, its filling is accomplished by lifting a feed bag up to its top portion. That requires a person to climb a ladder while carrying the feed bag. Thus, both the mounting of the hopper on the frame and its filling require extensive physical effort coupled with the necessity of using a ladder which presents the possibility that a person may fall and be injured. Third, the tripod configuration of the frame is not stable during high wind conditions which results in its overturning. Finally, the suspension of the hopper along a vertical plane requires the use of a funnel to deliver the feed to its outlet. The inclusion of the funnel complicates the construction of the hopper, thereby increasing its cost.

SUMMARY OF THE INVENTION

In accordance with the present invention, an animal feeder includes a hopper suspended from a frame utilizing a winch. The frame includes an A-shaped support member connected to a pair of feet. Wires connect between the upper portion of the support member and the ground to prevent the animal feeder from overturning, even under high wind conditions.

The hopper includes a drum having a removable lid and a bottom. A removable collar secures the lid to the drum once the drum has been filled with feed. The bottom of the drum includes an outlet which permits the dispensing of feed. The drum includes legs connected to its bottom portion to support the drum on the ground and prevent the outlet from clogging. A solenoid operated gate controlled by an interval timer regulates the flow of feed from the hopper to produce periodic feedings. A brace connects to the upper portion of the drum to permit the suspension of the drum from the frame by the winch.

The winch mounts to the support member, while a pair of pulleys support the winch cable at the top of the support member. The cable connects to a hook which then attaches to the brace connected to the upper portion of the drum to permit suspension of the hopper by the winch. The winch operates to lower the hopper to permit its easy filling with feed and to raise the hopper after it has been filled to suspend it from the frame.

Thus, to fill the hopper after it has dispensed all its feed, the winch is used to lower the hopper onto the ground. Once on the ground, the lid is removed and the drum filled with feed. The lid is then replaced and the winch used to raise the hopper back to its suspended position. The winch, therefore, eliminates the need to carry feed up a ladder to the hopper.

Additionally, a chain connected between the hook and the bottom portion of the drum elevates the bottom portion of the drum to provide the hopper with an angled orientation with respect to ground. The angling of the hopper permits the gravity flow of the feed to the outlet in the bottom of the hopper without the necessity of a funnel. The elimination of a funnel reduces the expense of constructing the hopper as well as increases the quantity of feed storable within the hopper.

It is, therefore, an object of the present invention to provide an animal feeder with a winch that allows the easy raising and lower of its hopper to permit the filling of the hopper.

It is another object of the present invention to provide an animal feeder with a frame consisting of an A-shaped support member coupled to a pair of feet.

It is a further object of the present invention to provide an animal feeder with wires connected between the support member and the ground to prevent the animal feeder from overturning, even under high wind conditions.

It is still a further object of the present invention to provide an animal feeder with a hopper suspended at an angle to the frame and ground.

Still other objects, features, and advantages of the present invention will become evident to those skilled in the art in light of the following.

BRIEF DESCRIPTION OF THE DRAWINGS

The FIGURE is a perspective view depicting the animal feeder of the present invention.

DETAILED DESCRIPTION OF THE PREFERRED EMBODIMENT

As illustrated in the FIGURE, animal feeder 10 includes hopper 11 suspended from frame 12 by winch 13. Frame 12 includes feet 14 and 15 which connect to support member 16. Feet 14 and 15 connect to support member 16 using any suitable means such as welding or nuts and bolts. Support member 16 is A-shaped and may be either a single section of pipe or multiple sections of pipe connected together. If support member 16 consists of multiple sections of pipe, each end of the sections terminate in a flange which connects with a corresponding flange of another section using nuts and bolts to form support member 16.

The upper portion of support member 16 includes eye hooks 17-19 which reside within holes through support member 16. Eye hooks 17-19 mount to support member 16 using a nuts. One end of wires 20-22 connect to eye hooks 17–19, respectively, while the opposite ends of wires 20–22 connect to a stake (not shown) driven into the ground. The connection of wires 20–22 to support member 16 and then to the stakes secures animal feeder 10 to the ground to prevent it from overturning. Thus, frame 12 which includes legs 14 and 15 and wires 20–22 provides a sturdy support for hopper 11 which will not overturn, even under high velocity wind conditions or when bumped by an animal.

Hopper 11 consists of drum 23 which includes bottom 24 and a lid (not shown). Collar 25 connects to the lower portion of drum 23 using any suitable means such as welding. Legs 26–29 connect to collar 25 using any suitable means such as welding to support drum 23 on the ground when it is in its lowered position. Leg 29 includes hole 30 which receives hook 31 connected to one end of chain 32. Similarly, leg 28 includes a hole (not shown) which a hook (not shown) connected to one end of chain 33. With one end of chains 32 and 33 secured to drum 23, the opposite ends of chains 32 and 33 are secured to respective legs of frame 12 to prevent drum 23 from swinging when it is in its raised position.

Collar 34 connects about the upper portion of drum 23 to secure the lid over drum 23. Collar 34 includes tabs 35 and 36 which permit both the securing and removal of collar 34 to the upper portion of drum 23. That is, after collar 34 has been positioned around the upper portion of drum 23, a bolt is passed through tabs 35 and 36 so that a nut may be utilized to tighten tabs 35 and 36 together. With tabs 35 and 36 tightened together, collar 34 is secured about the upper portion of drum 23 over the outer edges of the lid. Conversely, when the nut and bolt are removed from tabs 35 and 36, tabs 35 and 36 may be separated to allow the removal of collar 34 and, thus, the lid.

Bracket 37 and an identical bracket (not shown) positioned on the opposite side of drum 23 permit the suspension of hopper 11 from frame 10 by winch 13. Bracket 37 and the corresponding bracket on the opposite side of drum 23 connect to drum 23 using any suitable means such as welding. Brace 38 pivotally connects between bracket 37 and its corresponding bracket to permit winch 13 to support hopper 11. Brace 38 is triangular in shape and includes tabs that fit within holes in bracket 37 and the corresponding bracket where cotter pins (not shown) secure the tabs within the holes.

Winch 13 is may be any standard winch presently available for purchase. Winch 13 includes mounting plate 39 which connects to one leg of support member 16 using any suitable means such as welding. Mounting plate 39 holds spool 40 which has wire 41 wrapped thereabout. Handle 42 along with a gearing mechanism (not shown) permit the winding and unwinding of wire 41 from spool 40. Cables 46 and 47 connect pulleys 44 and 45, respectively, to the upper portion of support member 16 to allow the suspension of wire 41 along support member 16 by pulleys 44 and 45. The free end of wire 41 connects to hook 43 using any suitable means such as a clamp to permit the connection of winch 13 to brace 38.

Bracket 48 mounts onto collar 25 using any suitable means such as welding to permit hopper 11 to be oriented along the angle depicted in the FIGURE. Chain 49 connects between bracket 48 and hook 43 using any suitable means such as hooks to elevate the bottom portion of drum 23 to produce the depicted angled orientation. That is, the bottom portion of drum 23 may be lifted to pivot brace 38 about bracket 37 and its corresponding bracket such that chain 49 may be connected to hook 43.

By angling hopper 11, the necessity of a funnel in the interior of drum 23 to direct feed into outlet 50 from drum 23 is eliminated. That is, outlet 50 may be placed at the unelevated end of the bottom portion of drum 23 because the feed within drum 23 will flow naturally by gravity to that point due to the angled orientation of drum 23.

To prevent the uncontrolled flow of feed from drum 23, hopper 11 includes a solenoid operated gate (not shown) which covers outlet 50. A standard interval timer such as a Mark V Timer activates the solenoid at specified time intervals to periodically open the gate. Upon the opening of the gate, feed flows from outlet 50 onto the ground where it is consumed by animals. The interval timer maintains the activation of the solenoid for a predetermined feeding period. After the expiration of the feeding period, the interval timer closes the solenoid operated gate which then remains closed until the expiration of the next time interval.

The suspension of hopper 11 from frame 10 using winch 13 eliminates the necessity of hauling feed up a ladder to fill hopper 11. Thus, to fill hopper 11, the connection of chains 32 and 33 to the legs of support member 16 are loosened. Winch 13 is then utilized to lower hopper 11 until legs 28 and 29 touch the ground. Chain 49 is detached from hook 43 to permit hopper 11 to pivot until legs 26 and 27 also touch the ground. With hopper 11 firmly supported on the ground, collar 34 and the lid of drum 23 are removed. Next, drum 23 is filled with feed and the lid and collar 34 replaced. After the filling of hopper 11, winch 13 is used to slightly elevate hopper 11 to support the majority of its weight so that chain 49 may be reattached to hook 43 to provide hopper 11 with its angled orientation. Winch 13 is then utilized to elevate hopper 11 back to its raised position. Finally, the connections of chains 32 and 33 to the legs of support member 16 are retightened to prevent the movement of hopper 11.

Although the present invention has been described in terms of the foregoing embodiment, such description has been for exemplary purposes only and, as will be apparent to those of ordinary skill in the art, many alternatives, equivalents, and variations of varying degrees will fall within the scope of the present invention. That scope, accordingly, is not to be limited in any respect by the foregoing description, rather, it is defined only by the claims which follow.

I claim:

1. An animal feeder, comprising:
   a hopper including an outlet therefrom;
   a free-standing frame for suspending said hopper;
   a winch mounted on said free-standing frame, said winch including a cable suspended from said free-standing frame and connected to said hopper to permit said winch to raise and lower said hopper; and
   means connected between a lower portion of said hopper and said cable for providing an angular orientation of said hopper that directs feed within said hopper to said outlet from said hopper.

2. The animal feeder according to claim 1 wherein said free-standing frame comprises an A-shaped support member connected to a pair of feet.

3. The apparatus according to claim 1 wherein said winch cable is suspended from said free-standing frame by a pulley.

4. The apparatus according to claim 1 further comprising a wire for securing said free-standing frame to the ground.

5. The apparatus according to claim 1 wherein said hopper comprises a drum having a bottom and a removable lid.

6. The animal feeder according to claim 1 wherein said hopper includes a brace mounted to its top portion to permit the suspension of said hopper by said cable.

7. The animal feeder according to claim 1 wherein said means connected between a lower portion of said hopper and said cable to facilitate the angular orientation of said hopper comprises a chain.

8. The apparatus according to claim 1 wherein said outlet from said hopper is positioned on the bottom of said hopper adjacent a wall of said hopper.

9. The apparatus according to claim 1 wherein an interval timer controls a solenoid operated gate positioned over said outlet from said hopper to regulate the flow of feed from said hopper.

* * * * *